UNITED STATES PATENT OFFICE.

CECIL O. PHILLIPS, OF NEW YORK, N. Y.

TREATMENT OF COTTON-SEED MEATS.

1,278,075.   Specification of Letters Patent.   Patented Sept. 3, 1918.

No Drawing.   Application filed July 10, 1918.  Serial No. 244,293.

*To all whom it may concern:*

Be it known that I, CECIL O. PHILLIPS, a citizen of the United States, residing at New York city, in the county of New York, State of New York, have invented certain new and useful Improvements in Treatment of Cotton-Seed Meats, (Case B;) and I do hereby declare the following to be a full, clear, and exact description of the invention, such as will enable others skilled in the art to which it appertains to make and use the same.

This invention relates to improvements in the extraction of oil from crushed cotton-seed meats. The invention is based upon the discovery that the extraction of oil from cottonseed meats can be materially improved and the amount of oil extracted increased by cooking the ground meats in intimate admixture with a small amount of a dilute solution of sodium carbonate ($Na_2CO_3$), and by expressing the oil from the resulting cooked meats.

In the extraction of oil from cottonseed, as commonly practised, the seeds are decorticated or hulled and the kernels or meats are separated from the hulls before the oil is extracted. The meats are then ground or crushed and reduced to a finely-divided state and are then subjected to a cooking operation to promote the subsequent expression of the oil, after which the oil is expressed from the cooked meats under a heavy pressure.

The extraction of the oil from the cottonseed meats in this way leaves a considerable portion of the oil in the meats, usually amounting to around 6% or more.

I have found that the amount of oil left in the meats can be appreciably reduced, and the amount of oil extracted correspondingly increased, by carrying out the cooking operation with the addition of a small amount of a very dilute solution of sodium carbonate intimately combined with the ground meats, so that they are subjected to the action of such solution during the cooking operation.

In the practice of the invention, the dilute sodium carbonate solution is preliminarily added to the crushed meats and intimately combined therewith before the beginning of the cooking operation. Inasmuch as the solution is used only in small amounts, for example, three gallons per ton of seed, and since the solution is very dilute, it is important that it should be thoroughly and intimately intermixed with the crushed meats so that the entire mass of the meats will be acted upon thereby in a uniform manner. I have found that different strengths of the dilute sodium carbonate solution may be used, and also that varying amounts of water may be used and added therewith, but that the best results have been usually obtained with a solution containing about once ounce of sodium carbonate ($Na_2CO_3$) to the gallon, and using approximately three gallons of the solution for the meats from each ton of seed treated (each ton of seed giving approximately 1300 pounds of meats).

In the practice of the invention, the seed may be decorticated and the kernels separated from the greater portion of the hulls in the usual manner, so that usually less than twenty per cent. of the hulls will remain with the meats. The meats may then be crushed and ground in any suitable manner such as is commonly employed in their preparation for the cooking operation. Either before or after the crushing or grinding operation, the meats are sprayed with the sodium carbonate solution, or the solution may be otherwise added so that it will be uniformly and intimately distributed throughout the entire mass of the meats. When the solution is applied before the crushing operation, this operation will itself promote the uniform distribution throughout the crushed meats.

The meats are now ready for the cooking operation which may be carried out in common forms of cookers, and which will vary somewhat, depending upon the nature of the meats and the conditions under which the cooking is carried out, as will be readily understood. The cooking period may thus vary from fifteen to forty minutes, and is commonly carried on in steam jacketed heaters with a steam pressure of from twenty to one hundred pounds and with appropriate agitation of the meats during the cooking. During the cooking operation the oil becomes more fluid, the albuminous and mucilaginous constituents of the meats are cooked or coagulated, the oil cells expanded, and the meats otherwise changed so that the subsequent removal of the oil therefrom is facilitated.

I have found that the utilization of the sodium carbonate solution results in a further modification of the cottonseed meats during the cooking operation so that the subsequent expression of the oil is facilitated and the amount of oil which can be expressed, materially increased; and that this result is nevertheless obtainable with but a small amount of a very dilute sodium carbonate solution. The subsequent refining of the oil likewise seems to be promoted by the process of the present invention.

It will be evident that various types and arrangements of apparatus are available for the practice of the process of the present invention, and that many of the common types of apparatus may be used without substantial change, other than the provision for the intimate and thorough distribution of the sodium carbonate solution throughout the cottonseed meats subsequent to the decortication and prior to the cooking operation. The solution may thus be added in a continuous manner and continuously intermixed with the crushed meats while they are passing from the crushing rollers to the cooker, or prior to the passage of the meats through the pressure rolls, the amount of the solution being properly regulated so that a uniform amount may be incorporated with the meats.

The cottonseed meal remaining after the extraction of the oil is not injuriously affected by the cooking of the meats with the dilute sodium carbonate solution, but the meal may even be improved, and material improvements in color have, in fact, been noted.

The sodium carbonate solution may be produced by the use of soda ash ($Na_2CO_3$) in proper amount and by agitation to effect complete solution. I prefer, however, and recommend sal soda or the crystalline sodium carbonate ($Na_2CO_3+10H_2O$) for the reason that it is easily soluble in cold water and its use requires less attention on the part of the workmen. I have found that better results are usually obtainable when using the crystalline carbonate, and that the resulting meal was generally lighter in color.

The utilization of the dilute sodium carbonate solution, according to the present invention, enables a somewhat larger amount of moisture to be incorporated with the crushed meats during the cooking operation, thereby further improving the cooking process as it is usually carried out with the meats of mature seed. The sodium carbonate solution itself will supply a substantial amount of water for this purpose, and generally the amount of water above indicated, that is, about three gallons for the meats from each ton of seed, will be satisfactory, although this amount may be increased or decreased in accordance with the moisture already contained in the meats.

I claim:

1. The method of improving the extraction of oil from cottonseed meats which comprises cooking the crushed meats in intimate admixture with a small amount of a dilute sodium carbonate solution and expressing the oil from the cooked meats; substantially as described.

2. The method of improving the extraction of oil from cottonseed meats which comprises intimately incorporating with the crushed meats a small amount of a dilute sodium carbonate solution, subjecting the resulting meats to a cooking operation and expressing the oil from the cooked meats; substantially as described.

3. The method of improving the extraction of oil from cottonseed meats which comprises cooking the crushed meats in intimate admixture with a dilute solution of sodium carbonate containing about one ounce of the carbonate ($Na_2CO_3$) per gallon, and the solution being used in the proportions of about three gallons per ton of seed, and expressing the oil from the cooked seed; substantially as described.

4. The method of improving the extraction of oil from cottonseed meats which comprises intimately incorporating with the crushed meats a dilute solution of sodium carbonate containing about two and three-quarters ounces of crystalline sodium carbonate ($Na_2CO_3+10H_2O$) per gallon, and about three gallons of the solution being utilized per ton of seed, subjecting the resulting meats to a cooking operation and expressing the oil from the cooked meats; substantially as described.

In testimony whereof I affix my signature.

CECIL O. PHILLIPS.